United States Patent [19]

Ferenc et al.

[11] Patent Number: 4,971,745
[45] Date of Patent: Nov. 20, 1990

[54] METHOD FOR APPLYING A PRECISION AMOUNT OF SEALANT TO EXPOSED FASTENERS

[75] Inventors: Robert R. Ferenc, Dallas; Jay B. Mize, Arlington, both of Tex.

[73] Assignee: LTV Aerospace & Defense Company, Dallas, Tex.

[21] Appl. No.: 881,520

[22] Filed: Jun. 30, 1986

Related U.S. Application Data

[63] Continuation of Ser. No. 661,164, Oct. 15, 1984, abandoned.

[51] Int. Cl.$^5$ .............................................. B29C 00/00
[52] U.S. Cl. ...................................... 264/263; 264/268; 264/276; 264/271.1; 264/277
[58] Field of Search ............... 264/279, 271.1, 263, 264/272.11, 40.5, 268, 276

[56] References Cited

U.S. PATENT DOCUMENTS

| | | | |
|---|---|---|---|
| 1,556,029 | 10/1925 | Reagan | 264/262 |
| 2,010,934 | 8/1935 | Smith | 156/236 |
| 2,135,326 | 11/1938 | Galland | 264/262 |
| 2,208,732 | 7/1940 | Powell | 29/460 |
| 2,694,987 | 11/1954 | Kappler | 425/299 |
| 2,710,113 | 6/1955 | Pritchard | 156/90 |
| 3,217,617 | 11/1965 | Wiswell | 264/314 |
| 3,298,272 | 1/1967 | Henderson | 411/373 |
| 3,470,787 | 10/1969 | Machie | 264/250 |
| 3,885,492 | 5/1975 | Outshall | 411/373 |
| 3,893,792 | 7/1975 | Laczko | 264/40.5 |
| 3,957,560 | 5/1976 | Le Bon | 156/293 |
| 4,135,476 | 1/1979 | Duryea | 118/259 |
| 4,144,625 | 3/1979 | Hogenhout | 29/34 B |
| 4,382,049 | 5/1983 | Hofmeister et al. | 264/263 |
| 4,490,315 | 12/1984 | Charlebois et al. | 264/272.11 |
| 4,519,974 | 5/1985 | Bravenec et al. | 264/279 |

FOREIGN PATENT DOCUMENTS 1397500 3/1965 France.

Primary Examiner—Hubert C. Lorin
Attorney, Agent, or Firm—Charles S. Cotropia; James M. Cate

[57] ABSTRACT

A method for applying a uniform sealant coating over the portion of a fastener exposed above a panel includes applying a sealant retaining shell over the exposed portion of the fastener to define a closed volume between the shell, fastener and panel. The shell has an aperture, removed from the mouth of the shell, for receiving sealant therethrough. An injection nozzle receiving structure for receiving a sealant injector nozzle therein is provided adjacent and substantially aligned with the aperture. Sealant is injected into the shell through the injection nozzle receiving structure and through the aperture therein to fill the area between the fastener and the shell. A pressure is selected for injecting the sealant such that injection is stopped when the shell is filled. The sealant is allowed to cure and the retaining shell is removed.

16 Claims, 1 Drawing Sheet

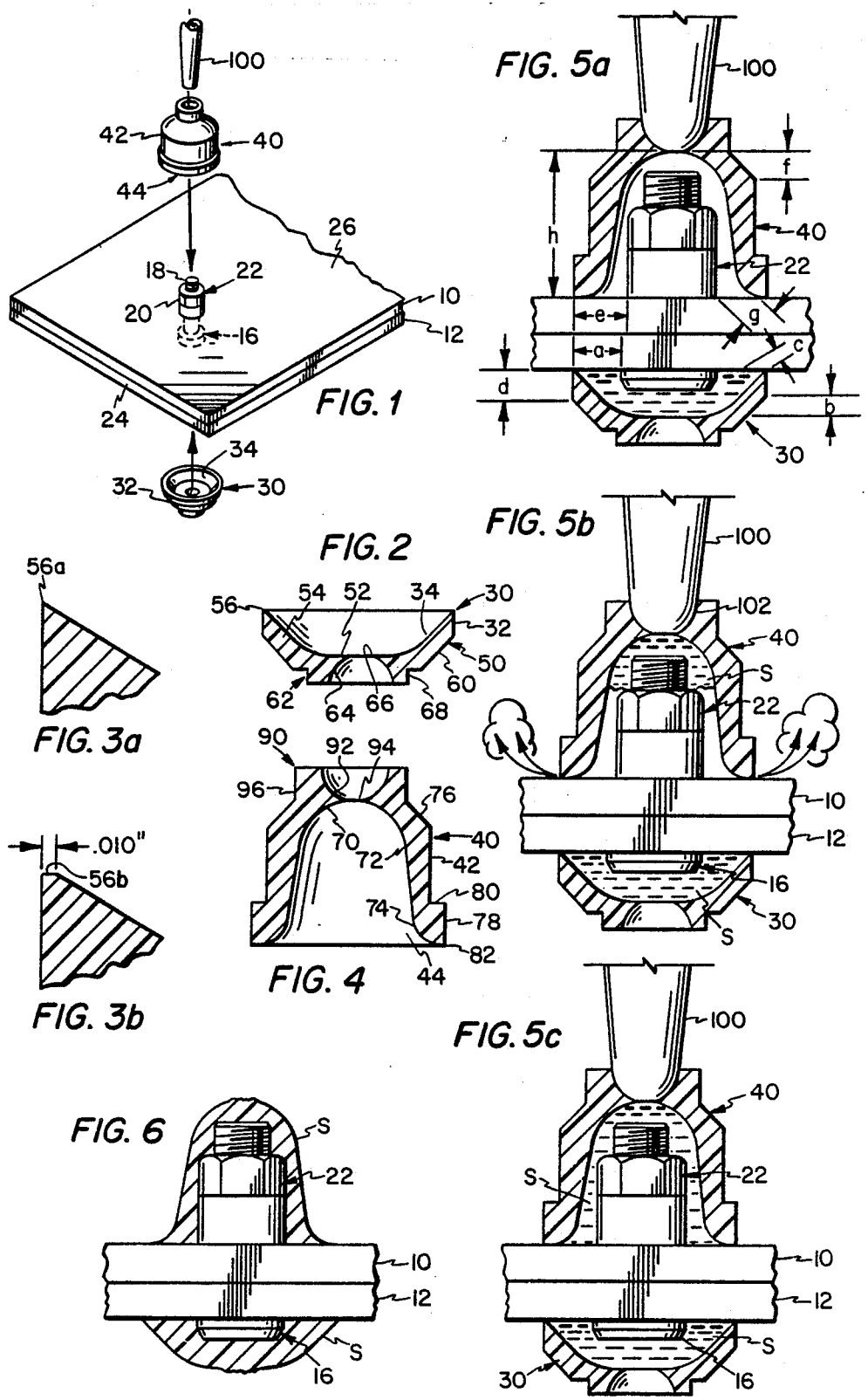

METHOD FOR APPLYING A PRECISION AMOUNT OF SEALANT TO EXPOSED FASTENERS

This application is a continuation, of application Ser. No. 661,164, filed Oct. 15, 1984, now abandoned.

TECHNICAL FIELD

The present invention relates to a method and apparatus for electrically insulating, sealing and providing corrosion resistance to exposed fasteners and more particularly to a method and apparatus which accomplishes these features by applying a precision amount of sealant to the fasteners.

BACKGROUND ART

In machine construction using rivets, bolts, fasteners and other means of attachment, it is often beneficial to apply a sealant to the exposed portion of the fasteners to protect it from corrosion and to provide electrical insulation. The sealant can also function to seal around the fasteners.

In the manufacture of production aircraft, it is often required that the rivets, bolts, fasteners and other protrusions be covered with a curable sealant to prevent corrosion and to provide electrical insulation. Conventionally, elastomeric sealant has been applied by directing the uncured sealant directly onto the individual fasteners such as by use of brush or stick applicator and permitting the sealant to cure. This has been found to provide inconsistent results in that the uncured sealant, normally a polyurethane resin, is not uniformly applied and tends to sag or deform from a symmetrical configuration prior to curing. This inconsistency in the resulting sealant coatings accomplished by the prior art methods has resulted in thin and nonuniform regions over the outer surfaces of the fasteners, where specific minimum thicknesses for the sealant are required, it has been difficult to consistently maintain such standards using the prior art methods.

Attempts have also been made to apply a layer of sealant to fasteners by using a sealant-retaining shell. In this arrangement, uncured sealant is loaded into a cup-shaped molding shell and is then applied over the exposed portion of the fastener or other element and brought into contact with the panel or other surface through which the fastener is attached. The uncured sealant is entrapped between the exposed portion of the fastener and the shell thereby covering the fastener with sealant. This method is disclosed in U.S. Pat. No. 4,519,974 filed Aug. 12, 1983, and assigned to the assignee of the present application. Other attempts to use a molding shell to apply an uncured sealant to the exposed portion of a fastener are found in U.S. Pat. No. 3,470,787, to William L. Mackie and U.S. Pat. No. 2,710,113, to D. J. Pritchard. While the prior art system disclosed in the above referenced U.S. Pat. No. 4,519,974 has met with success, the system requires metering an amount of sealant into the molding shell substantially equal to the difference in the volume of the fastener head and the volume of the cavity defined by the shell. This is required such that there is no excess sealant which would otherwise extrude out of the shell. Thus, this arrangement, while avoiding the extrusion of excess sealant, as exists in the methods of Mackie and Pritchard, does require more accurate metering of sealant into the molding shell. This presents some problem where differing fastener heads are being coated.

Thus, a need exists for a method and apparatus for coating exposed fastener heads where the coating is uniform and provides a smooth contour over the fastener without presenting the problems attendant to systems requiring accurate metering or where excess sealant must be provided to assure complete coverage of the fastener being sealed.

DISCLOSURE OF THE INVENTION

The present invention provides a method and apparatus for applying a uniform sealant coating over the portion of a rivet, bolt, fastener or other element exposed above a surface. The sealant coating prohibits corrosion, provides electrical insulation and seals the fastener and the surrounding area. The method of the present invention provides for applying a cup-shaped molding shell over the exposed portion of the fastener or other element to be sealed and into contact with the panel or other surface to which the fastener is attached. Sealant is injected into the interior cavity of the molding shell such that the space between the fastener or object and the interior cavity of the molding shell is filled with sealant. The sealant is allowed to cure, and the molding shell is removed.

In a preferred embodiment of the invention, the sealant is injected into the molding shell through a port in the head of the shell. An appropriate pressure is used to inject the sealant and air escape occurs between the shell and the panel or other surface against which the shell is applied. When the volume between the fastener or other object and the interior of the molding shell is filled with sealant, the selected injection pressure is set such that the sealant is not extruded from beneath the molding shell but rather sealant injection into the shell is automatically arrested. In this way, sealant is not extruded out of the shell and virtually no over extrusion occurs.

In a primary embodiment of the invention, a sealant injection pressure of 35 psi is used. However, it will be appreciated by those skilled in the art that the pressure at which air extrusion occurs but where extrusion of sealant from beneath the shell does not will depend upon the applied force by the operator, as well as the materials used in constructing the sealant shells and the material to against which the sealant shell is applied. Further, the type of sealant used will also determine the correct pressure. Thus, the present invention is intended to cover varying pressures needed to accommodate varying situations and materials.

In one embodiment of the invention, the sealant applicator for applying sealant to the portion of a fastener exposed above a panel to which the fastener is attached includes a molding shell having a surface for engagement with the panel adjacent the exposed portion of the fastener. The surface defines the mouth of the interior cavity within the shell and the cavity corresponds to the desired configuration for the sealant cover to be applied to the exposed fastener. An aperture is provided in the molding shell for receiving sealant therethrough and an injection nozzle receiving means is provided for receiving a sealant injector nozzle therein. The receiving means is aligned with the aperture in the molding shell such that the injection nozzle may be seated in the receiving means and sealant injected through the aperture in the molding shell for delivery into the shell cavity.

The injection nozzle receiving means may extend upwardly from the head of the molding shell to facilitate gripping of the molding shell for removal thereof. The injection nozzle receiving means is designed to sealingly receive an injector nozzle such that sealant loaded into the molding shell from the injector nozzle does not extrude from between the nozzle and molding shell receiving structure.

In the preferred embodiment, the molding shell is placed coaxially over the fastener or other element such that the sealant uniformly covers the fastener providing a uniform coat of sealant therearound. Although a measured quantity of uncured sealant may be injected into the molding shell substantially equal to the difference in the volume of the interior cavity of the shell and the volume of the exposed portion of the fastener such that the sealant completely fills the area between the fastener and the molding shell interior cavity, as has been described above, the present invention does not require such metering. By the selection of an appropriate pressure for injecting sealant into the molding shell, sealant is loaded into the molding shell until it is completely filled and further injection is then prevented by the seal which is made between the molding shell, sealant and panel against which the molding shell is engaged.

Although the present invention is described as used to apply a sealant cover to the exposed portions of a fastener extending through and attaching a pair of panels, it will be understood by those skilled in the art, that the present method and apparatus may be used to cover any other protrusion from a panel whether the protrusion be a fastener or other component. Only the shape and contour of the molding shells need be changed to apply the present method and apparatus to use for other protrusions which are to be electrically insulated, protected from corrosion, sealed or otherwise covered with a sealant. BRIEF DESCRIPTION OF THE DRAWINGS

BRIEF DESCRIPTION OF THE DRAWINGS

For a more complete understanding of the present invention and for further details and advantages thereof, reference is now made to the following Detailed Description taken in conjunction with the accompanying Drawings, in which:

FIG. 1 is a perspective view showing molding shells being positioned to apply a sealant to the head and tail of a fastener attached through panels;

FIGS. 2 illustrates a vertical section of the head molding shell according to the present invention;

FIG. 3a and 3b are enlarged views of alternative designs of the body engaging portion of the molding shell shown in FIG. 2;

FIG. 4 illustrates a vertical section of a tail molding shell; according to the present invention;

FIG. 5a-5c illustrate a vertical section of the head and tail molding shells applied to a fastener showing various stages of application of sealant therearound; and FIG. 6 is a section view of the sealed fastener with the molding shells removed.

DETAILED DESCRIPTION

The present invention relates to a method and apparatus for applying a sealant to the head and tail end of a fastener exposed above a panel to which the fastener is attached. FIG. 1 illustrates panels 10 and 12 attached by threaded fastener 14 having a head 16, a threaded end 18 and a nut 20 threaded on end 18. The head 16 and the tail end 22, represented by threaded end 18 and nut 20, are exposed above the surface 24 of panel 12 and surface 26 of panel 10, respectively.

Referring to FIG. 1, the present invention incorporates a head end molding shell 30 having a substantially cup-shaped configuration with a cylindrical outer sidewall 32 with a sealant receiving cavity 34 therein. A tail molding shell 40 is used for applying sealant to the tail end of fastener 14 and includes a substantially cylindrical outer wall 42 with a sealant receiving cavity 44.

FIGS. 2 and 4 illustrate the tail and head molding shells 30 and 40, respectively, in more detail. Head molding shell 30 includes a body 50 having a cavity 34 formed therein. Cavity 34 has a bottom 52 and a beveled sidewall 54 which joins cylindrical outer sidewall 32 to define an annular mouth 56. As can be seen in the detail of FIG. 3a and 3b, mouth 56 may be formed as a knife edge 56a (FIG. 3a) or to provide a flat 56b (FIG. 3b). Where a flat is provided such as that shown in FIG. 3b, 0.010 inch has been determined to be the preferred dimension.

Body 50 has an annular beveled shoulder 60 which joins body 50 to a sealant nozzle receiving structure 62. Structure 62 includes a nozzle receiving cup 64 having an injection port 66 in the base thereof. Port 66 communicates into receiving cavity 34. Structure 62 also defines an annular extension ring 68 which provides support for the injection nozzle and facilitates gripping shell 30 for removal.

Referring to FIG. 4, tail molding shell 40 includes a contoured cavity 44 therein having a circular bottom 70 with a first tapered annular wall 72 merging to a more extreme tapered second wall 74. The exterior of molding shell 40 is generally cup shaped having a conical shoulder 76 joining a substantially cylindrical side wall 42 with a lower flange 78 joined thereto by a step 80. Second wall 74 of cavity 44 joins flange 78 at an annular mouth 82.

Like molding shell 30, molding shell 40 has a sealant nozzle receiving structure 90 defining a nozzle cup 92 having a port 94 at the base thereof. Port 94 defines an opening between nozzle receiving cup 92 and cavity 44 of shell 40. Nozzle receiving structure 90 also defines an annular extension ring 96 which partially defines the sealant nozzle receiving structure and provides an extension which facilitates gripping molding shell 40.

Referring to FIGS. 2 and 4 in conjunction with FIGS. 5a, 5b and 5c, it is shown that molding shell 30 and shell 40 are used to apply a uniform coat of sealant over head 16 and nut 20 of fastener 14. Referring specifically to FIG. 5a, molding shell 40 is coaxially positioned over fastener 14 with annular mouth 82 engaging surface 26 of panel 10. A nozzle 100, having a tip 102 which conforms to cup 92 of sealant nozzle receiving structure 90, is positioned within the nozzle receiving structure as shown. An appropriate sealant 5 is then injected through nozzle 100 and port 94 such that it fills the cavity between fastener 14 and cavity 44 of shell 40. As can be seen in FIG. 5b, as sealant is loaded into the area between fastener 14 and molding shell 40, air escapes between shell 40 and surface 26 of panel 10. Upon selection of an appropriate injection pressure, sealant continues to flow into the area between the bolt and molding shell until the area is completely filled with sealant. However, upon filling of the area between the bolt and shell, and with the application of a light pressure on the molding shell against panel 10, flow into the shell is arrested upon filling. Thus, no excess sealant is extruded from the shell onto the panel. Likewise, no sealant is extruded from between the nozzle and nozzle receiving structure of the molding shell. In a preferred embodiment, an injection pressure of 35 psi is used.

The use and application of molding shell 30 is similar to that discussed above with respect to molding shell 40. FIG. 5a shows molding shell 30 in place, subsequent to the application of sealant into cavity 34 by way of port 66, using an injection nozzle as described above. In view of the sealant used, sufficient adhesion exists such that the molding shell will remain in place even though inverted, as shown in FIG. 5a.

As will be noticed in FIG. 5a, with the molding shell 30 coaxially positioned over head 16, a uniform dome shaped sealant cover is applied over the head and the surrounding area of panel 12. The thickness of the dome-shaped sealant cap may be varied in thickness at any point by varying the contour and dimensions of cavity 36. As is common in applying sealant to fasteners in production aircraft, minimum dimensions as identified by the dimensions "a", "b", "c" and "d" must be met. By merely controlling the contour and dimensions of cavity 36, each of these minimum dimensions may be readily met without the need to apply sealant to a greater thickness than is required.

As described with respect to head molding shell 30, the cavity 44 is appropriately contoured and dimensioned such that the sealant cover has sufficient thicknesses at points designated by "e", "f", "g" and "h" to meet the requirements set for a particular application. These dimensions may be readily altered by merely changing the configuration or the dimension of cavity 44. It will further be appreciated that whether the molding shell is applied upright, such as with respect to molding shell 40, or inverted, such as with molding shell 30, sagging or other movement of the sealant prior to curing is obviated in view of the molding function provided by the shells.

The sealant used in the present invention may vary from application to application. When the present invention is used to seal fasteners used on production aircraft, the following materials may be used according to the specifications required: Material no. 899-B-2, produced by Essex Chemical Corporation, Pro-Seal Division, 19451 Susana, Compton, Calif. 90221; Material no. 579-B-2, manufactured by Goal Chemical Sealants Corporation, 3137 East 26th Street, Los Angeles, Calif. 90023; Materials 1750-B2 and 595-B2, manufactured by Products Research and Chemicals Corporation, 5430 San Fernando Road, Glendale, Calif. 91203.

Although any appropriate sealant gun and nozzle may be used, the model 250 Semco sealant gun using Semco sealant nozzle model no. 254 has been found to perform satisfactorily for purposes of the present invention.

Subsequent to curing of the sealant, the molding shells are moved merely by grasping the shells and applying an appropriate force to dislocate the shells relative to the cured sealant. Sealant nozzle receiving structures 62 and 90 provide structures which facilitate gripping of the shells for removal. In one embodiment of the invention, the shells are formed with a smooth inner surface to facilitate removal. Further, the shells are preferably manufactured from polyethylene, such as by injection molding, but may be made from any number of other materials, using other means of manufacturing, including machining of the shells. In the preferred embodiment, the polyethylene shells are substantially rigid although more resilient shells may be used as a suitable alternative.

FIG. 6 shows fastener 14 covered with the cured sealant subsequent to the removal of the molding shells 30 and 40. As can be seen, an appropriate coating of sealant 5 with a uniform contour is formed over the fastener head and tail thereby avoiding thin points of coverage as is sometimes experienced using prior art methods of applying the sealant. As is further seen in FIG. 6, there is no excess sealant on the panel 10 but rather only the smooth contour provided by the sealing shell remains upon removal of the shell. Thus, the present invention provides a selected contour as defined by the interior cavity of the sealant shells. Further, the loading of the shells is greatly simplified in that the flow of sealant into the molding shells is automatically stopped upon filling of the shells. This avoids the need for metering sealant into the shell and eliminates any excess sealant regardless of the volume of cavity defined between the fastener and the molding shell. Of course, substantial time and labor is saved by eliminating any excess extrusion where such extruded sealant would otherwise have to be removed.

Thus, the present invention provides an improved method and structure for applying a uniform layer of sealant over the head and tail of fasteners used in manufacture of production aircraft. The present method includes applying a sealant retaining shell having an interior cavity over the portion of the fastener to be covered. Sealant is injected into the interior cavity of the sealant-retaining shell through a port in the head of the molding shell. An appropriate sealant injection pressure is used such that when the cavity between the fastener and the shell is filled, the flow of sealant into the cavity is stopped automatically. The sealant is allowed to cure and the molding shells are removed leaving a uniform coating on the fastener.

Although the primary embodiment has been described as being applicable in this application, it will be readily appreciated that the present invention may be incorporated in any type of manufacture or construction where a sealant is to be applied over a fastener. Further, the present invention may also be applied where a sealant is to be uniformly applied over any protrusion from a surface, whether the surface be planar, such as in the case of an aircraft panel, or irregular in shape. The only modification which would be required is contouring of the molding shells to provide for seating of the shell to the surface adjacent the object to be covered. Alternatively, the shell might also be designed for engagement with the object itself where sealant is not required on any surface adjacent to the object covered.

Although preferred embodiments of the invention have been described in the foregoing Detailed Description and illustrated in the accompanying Drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit and scope of the invention.

We claim:

1. A method of applying a sealant over an object comprising:

(a) applying a sealant retaining shell, having an interior cavity with a mouth thereto, with the mouth of the cavity engaging the object;

(b) applying a force on the shell to engage the mouth of the shell against the object;

(c) injecting an amount of sealant into the interior cavity of the sealant retaining shell under a pressure sufficient to cause said sealant to fill the space between the object and the interior cavity of the shell and insufficient, when said space is filled with said sealant, to overcome said applied force to step (b) and force said sealant to flow between the mouth of the shell and the object, thereby arresting the flow of sealant into said cavity; and (d) allowing the sealant to cure.

2. The method according to claim 1 further comprising:

removing the shell after the sealant has cured.

3. The method according to claim 1 wherein the shell has a pre-determined interior configuration and volume.

4. A method of applying a sealant around the portion of a fastener exposed above a panel to which the fastener is attached comprising:

applying a sealant retaining shell over the exposed portion of the fastener to define a closed volume between the shell, fastener and panel;

applying a pressure on the shell to engage the shell against the panel during injection of the sealant;

injecting an amount of sealant into the interior cavity of the sealant retaining shell at a pressure such that sealant fills the space between the object and the interior cavity of the shell but is arrested when the space is filled thereby preventing the flow of fluid between the mouth of the shell and the object; and allowing the sealant to cure.

5. The method of claim 4 wherein said pressure is about 35 psi.

6. The method according to claim 4 further comprising:

removing the shell after the sealant has cured.

7. The method according to claim 4 wherein said injecting comprises:

injecting an amount of sealant into the shell substantially equal to the difference in volume of the interior cavity of the shell and the volume of the exposed portion of the fastener.

8. A method of applying a sealant to cover the portion of a fastener exposed above a panel to which the fastener is attached and the point of engagement of the fastener with the panel comprising:

(a) applying a sealant retaining shell over the exposed portion of the fastener and into contact with the panel to define a closed cavity between the shell and the fastener and panel;

(b) applying a force on the shell to engage the shell against the panel during injection of the sealant;

(c) injecting an amount of sealant into the interior cavity of the sealant retaining shell under a pressure sufficient to cause said sealant to fill the space between the object and the interior cavity of the shell and insufficient, when said space is filled with said sealant, to overcome said applied force of step (b) and force said sealant to flow between the mouth of the shell and the object, thereby arresting the flow of sealant into said cavity; and (d) allowing the sealant to cure.

9. The method according to claim 8 wherein said pressure is about 35 psi.

10. The method according to claim 8 further comprising:

removing the shell after the sealant has cured.

11. The method according to claim 8 wherein the shell has a pre-determined interior configuration and volume.

12. The method according to claim 8 further comprising:

centering the shell over the exposed portion of the fastener prior to the curing of the sealant to provide a uniform sealant coat around the fastener and at the point of engagement of the fastener with the panel.

13. A method of applying a sealant over an object comprising:

applying a sealant retaining shell, having an interior cavity with a mouth thereto, with the mouth of the cavity engaging the object;

injecting an amount of sealant into the interior cavity of the sealant retaining shell through single port in the head of the shell opposite the mouth of the shell with the mouth of the shell engaging the object such that the space between the object and the interior cavity is filled with sealant;

allowing the sealant to cure; and further comprising (a) applying a force on the shell to engage the mouth of the shell against the object, and (b) injecting said sealant into the shell under a pressure sufficient to fill said space but insufficient when said space is filled with said sealant to overcome said applied force on the shell and force said sealant to flow between the mouth of the shell and the object, thereby arresting the flow of sealant into said cavity.

14. A method of applying a sealant over an object comprising:

applying a sealant retaining shell having an interior cavity with a mouth thereto, with the mouth of the cavity engaging the object, the shell having a port in the head thereof with an injection nozzle receiving connection communicating with the port, engaging an injection nozzle in the nozzle receiving connection;

injecting an amount of sealant through the port into the interior cavity of the sealant retaining shell with the shell engaging the object such the space between the object and the interior cavity is filled with sealant;

allowing the sealant to cure;

removing the shell after the sealant has cured by engaging the nozzle receiving connection; and further comprising (a) applying a force on the shell to engage the mouth of the shell against the object, and (b) injecting said sealant into the shell under a pressure sufficient to fill said space but insufficient when said space is filled with said sealant to overcome said applied force on the shell and force said sealant to flow between the mouth of the shell and the object, thereby arresting the flow of sealant into said cavity.

15. The method according to claim 14 wherein the shell has a pre-determined interior configuration and volume.

16. The method of applying a sealant over an object comprising:

(a) applying a sealant-retaining shell having an interior cavity with a mouth of the cavity engaging the object, said shell having a nozzle-receiving connection defined by a cup formed in the exterior surface of said shell in the head thereof opposite the mouth of said shell, said cup having an injection port at the base thereof opening into the interior of said shell;

(b) engaging the tip of an injection nozzle into said cup and into communication with said port to permit the injection of sealant from said nozzle and through said port into the interior of said shell;

(c) injecting an amount of sealant through said nozzle and said port into the interior cavity of the sealant retaining shell with the shell engaging the object such that the space between the object and the interior cavity is filled with sealant;

(d) allowing the sealant to cure;

(e) removing the shell after the sealant has cured; and further comprising engaging the tip of said injection nozzle into said cup under an applied force on said shell to engage the mouth of the shell against the object and injecting said sealant into the shell under a pressure sufficient to fill said interior cavity but insufficient when said interior cavity is filled with said sealant to overcome the applied force imposed by the tip of said nozzle on the shell and force said sealant to flow between the mouth of the shell and the object, thereby arresting the flow of sealant into said cavity.

* * * * *